US012637145B2

(12) United States Patent
Satoi et al.

(10) Patent No.: US 12,637,145 B2
(45) Date of Patent: May 26, 2026

(54) VEHICLE REAR PART COMPONENT

(71) Applicant: TOYOTA JIDOSHA KABUSHIKI KAISHA, Aichi-ken (JP)

(72) Inventors: Taisuke Satoi, Okazaki (JP); Yuya Saruwatari, Okazaki (JP); Yuta Egawa, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 418 days.

(21) Appl. No.: 18/393,668

(22) Filed: Dec. 22, 2023

(65) Prior Publication Data

US 2024/0208585 A1     Jun. 27, 2024

(30) Foreign Application Priority Data

Dec. 26, 2022     (JP) ................................. 2022-207977

(51) Int. Cl.
B62D 25/08          (2006.01)
B62D 25/02          (2006.01)

(52) U.S. Cl.
CPC ........... B62D 25/088 (2013.01); B62D 25/02 (2013.01)

(58) Field of Classification Search
CPC ...... B62D 25/088; B62D 25/08; B62D 25/02; B62D 25/04; B62D 25/20; B62D 25/2027; B62D 25/2036; B62D 29/008; B60G 13/003
USPC ............ 296/187.11, 187.08, 187.12, 193.04, 296/19.05, 193.06, 193.09, 198, 203.03, 296/203.04, 29
See application file for complete search history.

(56) References Cited

U.S. PATENT DOCUMENTS

| | | | | |
|---|---|---|---|---|
| 8,033,596 | B2 * | 10/2011 | Neumann ............ | B62D 25/088 |
| | | | | 296/203.03 |
| 8,528,967 | B2 * | 9/2013 | Schwarz ............ | B62D 25/2027 |
| | | | | 296/204 |
| 8,926,006 | B2 * | 1/2015 | Mildner ............. | B62D 25/2009 |
| | | | | 296/193.07 |
| 11,364,954 | B2 * | 6/2022 | Kiyoshita ............. | B62D 21/11 |
| 2023/0211825 | A1 * | 7/2023 | Park .................... | B62D 29/008 |
| | | | | 296/193.09 |
| 2024/0208572 | A1 * | 6/2024 | Satoi ...................... | B62D 21/11 |
| 2024/0208573 | A1 * | 6/2024 | Satoi ...................... | B62D 21/11 |
| 2024/0208576 | A1 * | 6/2024 | Egawa ................. | B62D 21/152 |
| 2024/0208579 | A1 * | 6/2024 | Hata .................. | B62D 25/2027 |

(Continued)

FOREIGN PATENT DOCUMENTS

JP          H06286652 A   * 10/1994

OTHER PUBLICATIONS

Motor Fan Illustrated Editorial Team, "Mercedes-AMG GT AMG Development No. 2 GT car with space frame structure", https://car.motor-fan.jp/tech/10010224, Jun. 24, 2019, 8pp.

(Continued)

*Primary Examiner* — Amy R Weisberg
*Assistant Examiner* — Veronica M Condo
(74) *Attorney, Agent, or Firm* — HAUPTMAN HAM, LLP

(57)          ABSTRACT

The rear structural member is a hollow member composed of a main body, a tower, and a suspension member attachment, the main body, the tower, and the suspension member attachment are integrally cast, and the tower has a closed cross-sectional structure composed of a right side plate, a left side plate, a front plate, and a rear plate.

5 Claims, 6 Drawing Sheets

A-A CROSS SECTION

(56) References Cited

U.S. PATENT DOCUMENTS

2024/0208584 A1*   6/2024   Satoi ...................... B62D 25/04
2024/0208587 A1*   6/2024   Satoi .................. B62D 25/2027

OTHER PUBLICATIONS

The 296 GT3, "designed only to win, marks a new page in Ferrari's racing history! Non-hybrid V6 turbo, 600 hp", https://intensive911. com/italian-car-brand/ferrari/260154/, Jul. 30, 2022, 8pp.

* cited by examiner

A-A CROSS SECTION

B-B CROSS SECTION

310

92

94

93

13B

19

10

100

12

50

42

40

45

47

46A

46

41

11

14

51

52

C-C CROSS SECTION

UP

RH

FR

VEHICLE REAR PART COMPONENT

CROSS REFERENCE TO RELATED APPLICATION

This application claims priority to Japanese Patent Application No. 2022-207977 filed on Dec. 26, 2022, which is incorporated herein by reference in its entirety including the specification, claims, drawings, and abstract.

TECHNICAL FIELD

The present disclosure relates to the structure of vehicle rear part component. More specifically, the present disclosure relates to a structure of vehicle rear part component for accommodating a suspension device.

BACKGROUND

In recent years, a vehicle structure has been studied in which framework structures of a vehicle are molded by casting such as aluminum, and the framework structures are joined to form a vehicle body frame. For example, JP06-286652A discloses a structure in which left and right rear frames, left and right suspension towers, and cross members connecting the left and right rear frames in the vehicle width direction are integrated by casting.

SUMMARY

However, the cast product described in JP06-286652A is a cast product having the same shape as that of the rear frame, the sustainer, and the cross member formed of a plate member, and the thickness of the member is thick, and there is room for improvement from the viewpoint of weight reduction of the vehicle.

Accordingly, it is an object of the present disclosure to reduce the weight of a vehicle and improve the strength and rigidity of the vehicle.

The vehicle rear part component of the present disclosure is connected to the rear end of the rocker and the rear pillar and extends rearward of the vehicle. The vehicle rear part component is a hollow member composed of a main body, a tower, and a suspension member attachment. The body, the tower, and the suspension member attachment are integrally cast. The main body has a closed cross section at least partially and extends in the longitudinal direction of the vehicle to connect the rear pillar and the rear member of the rear portion of the vehicle. The tower is connected to an upper side of the body and includes a space for accommodating a portion of the suspension device. The suspension member attachment has a closed cross section at least partially at a lower side of the main body, and a front end thereof is connected to the rocker and the rear pillar. The tower has a closed cross-sectional structure, and the closed cross-sectional structure includes an inner plate positioned on the inner side in the vehicle width direction, an outer plate positioned on the outer side in the vehicle width direction, a front plate positioned on the front side of the vehicle, and a rear plate positioned on the rear side of the vehicle.

Thus, by providing the tower with a closed cross-sectional structure, the strength and rigidity of the tower in the front-rear direction can be increased.

In the vehicle rear part component according to the present disclosure, the tower includes the inner plate, the outer plate, and a ceiling plate connected to the front plate and the rear plate. The tower outer plate is provided with a cylindrical recessed portion which is recessed toward the inner side in the vehicle width direction and inclined obliquely toward the outer side in the vehicle width direction. The space for accommodating a part of the suspension device may be an inner space of the recess.

This makes it possible to further increase the strength and rigidity of the tower.

In the vehicle rear part component of the present disclosure, the front plate of the tower and the front portion of the concave portion of the outer plate may have a triangular columnar cross section extending upward from the main body. The rear plate of the tower and the rear portion of the concave portion of the outer plate may form a triangular columnar cross section extending upward from the main body.

Thereby, the strength and rigidity of the tower in the front-rear direction can be improved.

In the vehicle rear part component according to the present disclosure, the main body has a closed cross section of a quadrangular shape or an ellipse formed by an upper plate, a lower plate, an inner plate in the vehicle width direction, and an outer plate in the vehicle width direction. The upper plate of the main body is cut at a location where the main body is connected to the tower, and is divided into a front upper plate positioned in front of the location where the main body is connected to the tower, and a rear upper plate positioned in rear of the location where the main body is connected to the tower. A lower end of the front plate of the tower is connected to the front upper plate of the main body. A lower end of the rear plate of the tower is connected to the rear upper plate of the main body. The inner plate of the tower is connected to an inner plate of the main body in the vehicle width direction. The outer plate of the tower is connected to the vehicle width direction outer plate of the main body. The tower and the main body have a closed cross-sectional structure, and the closed cross-sectional structure is formed of the front plate, the rear plate, the ceiling plate, the lower plate, the inner plate, the inner plate in the vehicle width direction, the outer plate, and the outer plate in the vehicle width direction.

Thus, the main body and the tower are integrally formed into a closed cross-sectional structure, whereby weight can be reduced and strength and rigidity can be improved.

The present disclosure can reduce the weight of a vehicle and improve the strength and rigidity of the vehicle.

DESCRIPTION OF EMBODIMENTS

Figure 1:
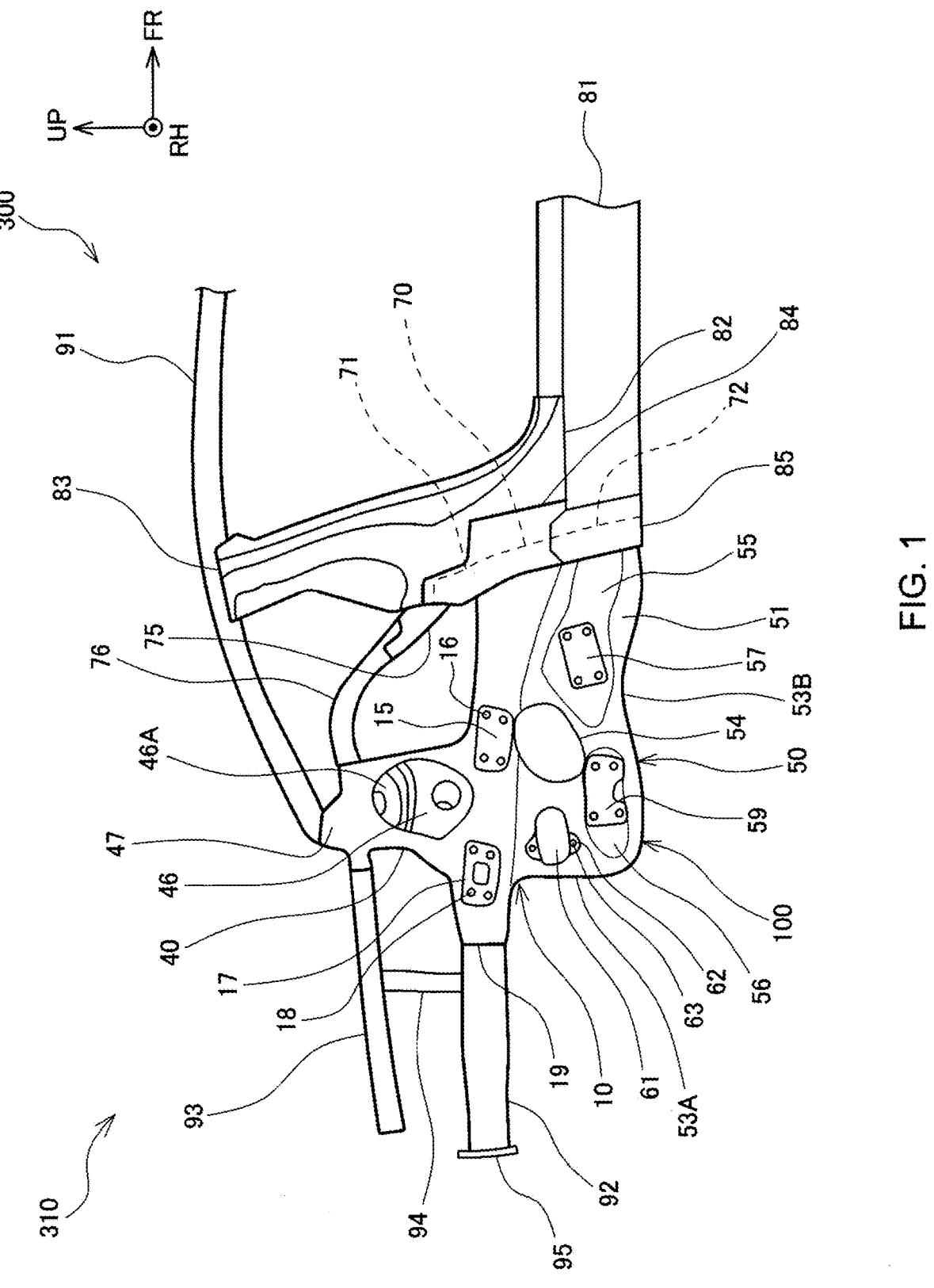
FIG. 1 is a side view showing a rear structure of a vehicle including a rear component of an embodiment.

Hereinafter, a vehicle rear part component 100 (hereinafter referred to as a rear structural member 100) according to an embodiment of the present disclosure will be described with reference to the drawings. A rear structure 310 of a vehicle 300 comprising a rear structural member 100 will now be described with reference to FIG. 1. In the following description, the rear structure 310 of the right side portion of the vehicle 300 will be described. Since the rear structure 310 of the left side portion of the vehicle 300 is bilaterally symmetrical with the rear structure 310 of the right side portion, a description thereof will be omitted. Arrows FR, UP, and RH shown in the drawings indicate the front side, the upper side, and the right side of the vehicle 300. The opposite directions of the arrows FR, UP, and RH indicate the rear side, the lower side, and the left side. Hereinafter, in the case of simply using the front-rear direction, the left-right direction, and the up-down direction, unless otherwise specified, the front-rear direction, the left-right direction, and the up-down direction of the vehicle 300 are indicated.

As shown in FIG. 1, the rear structure 310 of the vehicle 300 includes a rocker 81, a rear pillar 84, a rear pillar outer 82, a rear structural member 100, a rear member 92, a cross connecting member 93, a post 94, a connecting member 76, and a roof rail 91.

The rocker 81 is a structural member extending in the front-rear direction at a side end of the vehicle 300. Rocker 81 has a rectangular closed cross-sectional shape. A rear pillar 84 is attached to the upper surface of the rear end of the rocker 81. A rear pillar outer 82 is connected to an upper portion and a front portion of the rear pillar 84. The lower end of the rear pillar outer 82 is connected to the upper surface of the rear end of the rocker 81. A rear end plate 85 is attached to the rear end of the rocker 81. Thus, the rear pillar 84 and the rear pillar outer 82 are attached to the rear end portion of the rocker 81.

The rear structural member 100 is connected to the rear end of the rocker 81 and the rear pillar 84, and extends rearward of the vehicle. The rear structural member 100 is a hollow member integrally molded, and is composed of a main body 10, a tower 40, a suspension member attachment 50, and a front end block 70. The structure of the rear structural member 100 will be described in detail later with reference to FIGS. 2 to 6.

The rear member 92 is a closed cross-sectional structural member connected to the rear end 19 of the rear structural member 100 and extending rearward of the vehicle. A rear end plate 95 is attached to the rear end of the rear member 92.

The cross connecting members 93 are cross members that connect the rear ends of the upper pedestals 47 of the towers 40 of the left and right rear structural members 100 to the left and right. The post 94 is a closed cross-sectional member that connects the upper surface of the rear member 92 and the lower surface of the cross connecting member 93. The connecting member 76 is a closed cross-sectional member that connects the front end of the upper pedestal 47 of the tower 40 and the upper portion of the front end block 70.

The roof rail 91 is a structural member which is a component of a roof of the vehicle 300. The roof rail 91 is a longitudinal member having a closed cross section extending in the front-rear direction at a side end portion of an upper portion of the vehicle 300. A central portion of the roof rail 91 is connected to an upper end 83 of the rear pillar outer 82. The roof rail 91 extends obliquely rearward from the upper end 83 of the rear pillar outer 82 toward the upper pedestal 47 of the tower 40. The rear end of the roof rail 91 is connected to the upper pedestal 47 of the tower 40.

Next, the structure of the rear structural member 100 will be described with reference to FIGS. 2 to 6. As described above, the rear structural member 100 is a hollow member that is integrally molded, and includes the main body 10, the tower 40, the suspension member attachment 50, and the front end block 70.

Figure 2:
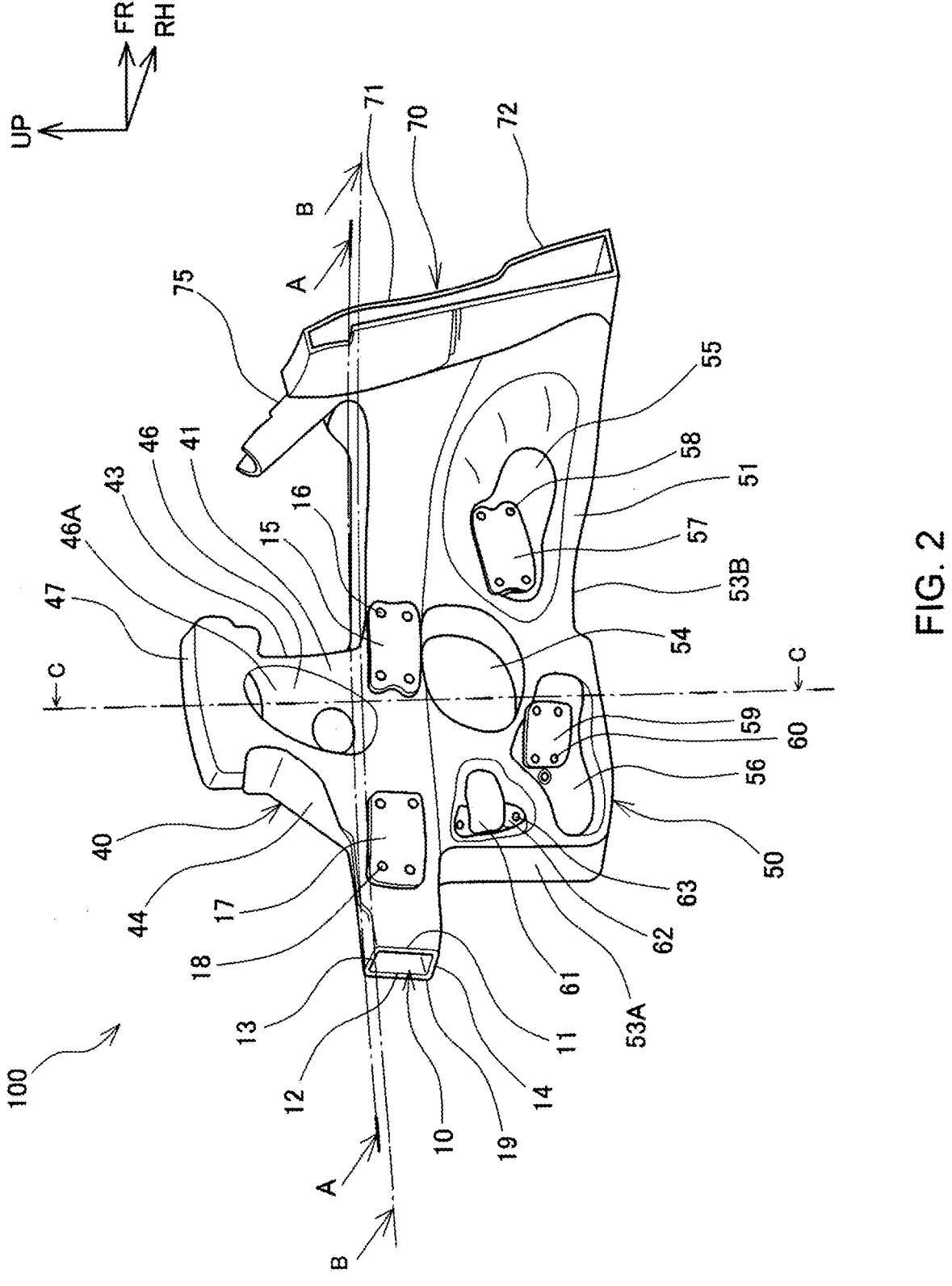
FIG. 2 is a perspective view showing a rear component of the embodiment.

As shown in FIG. 2, at least a part of the main body 10 is a closed section and extends in the longitudinal direction of the vehicle. The front end of the main body 10 is connected to the upper half 71 of the front end block 70. A general part of the main body 10 is a rectangular closed cross-sectional part composed of an upper plate 13, a lower plate 14, a right side plate 11, and a left side plate 12. Here, the right side plate 11 includes an outer side plate in the vehicle width direction. The left side plate 12 includes an inner side plate in the vehicle width direction. A portion (a portion other than the general portion) of the main body 10 connected to the tower 40 will be described later.

The closed cross-sectional shape of the main body 10 and the closed cross-sectional shape of the rear member 92 are the same. Accordingly, when the rear member 92 is connected to the rear end 19 of the main body 10, the main body 10 and the rear member 92 form a rear side member which is a structural member extending from the rear pillar 84 toward the rear of the vehicle.

Figure 3:
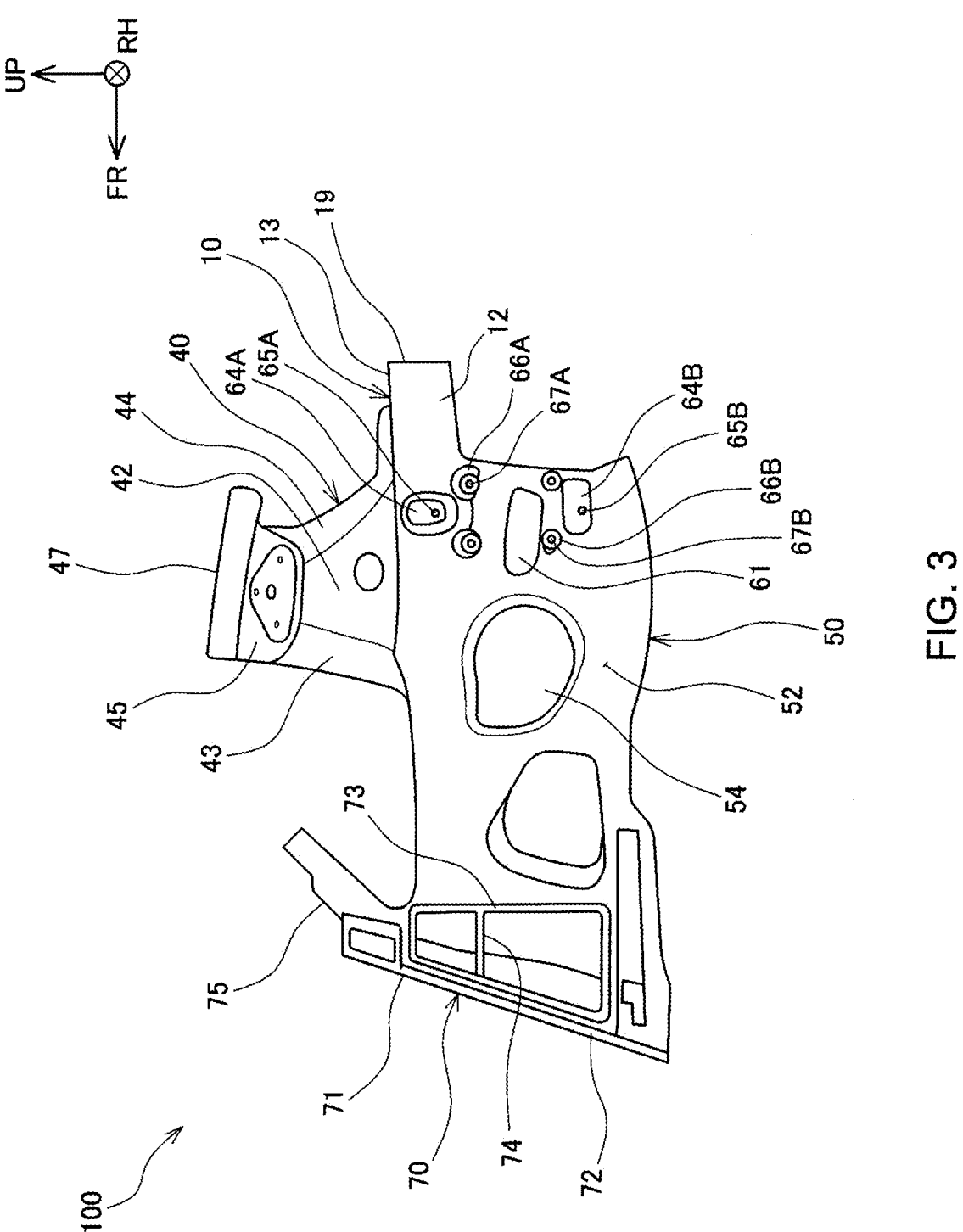
FIG. 3 is a side view showing an inner side surface in a vehicle width direction of the rear component of the embodiment.

Pedestals 15 and 17 are provided on the surface of the right side plate 11. The pedestals 15 and 17 are portions to which arm brackets (not shown) of upper arms (not shown) of the suspension device 200 (see FIG. 5) are fixed. The pedestals 15 and 17 are provided with bolt holes 16 and 18 for fixing the arm brackets. As shown in FIG. 3, a pedestal 64A is provided on the surface of the left side plate 12. The pedestal 64A is a portion to which a transaxle mount bracket (not shown) that connects an upper portion of the transaxle (not shown) and the main body 10 is fixed. A bolt hole 65A for fixing the transaxle mount bracket is formed in the pedestal 64A.

Figure 4:
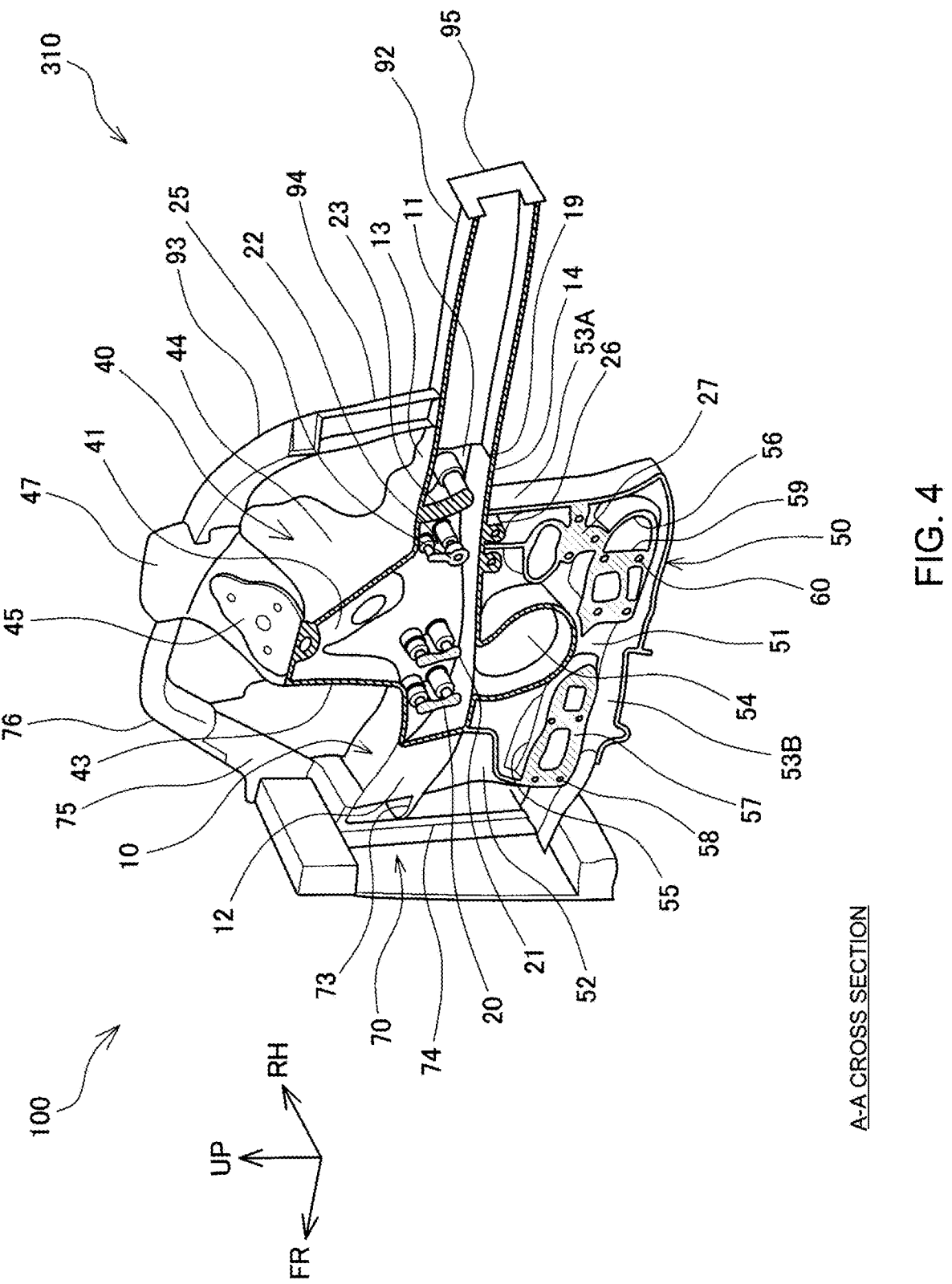
FIG. 4 is a cross-sectional perspective view of the rear structural member taken along the line A-A shown in FIG. 2.

As shown in FIG. 4, first connecting members 20 to 23 are provided inside the main body 10. The frontmost first connecting member 20 is disposed at a first position where the bolt hole 16 is provided in front of the pedestal 15. The first connecting member 20 connects the right side plate 11 and the left side plate 12 in the vehicle width direction at the first position. The second first connecting member 21 from the front is disposed at a second position where the bolt hole 16 is provided at the rear of the pedestal 15. The first connecting member 21 connects the right side plate 11 and the left side plate 12 in the vehicle width direction at the second position. The third first coupling member 22 from the front is disposed at a third position where the bolt hole 18 is provided in front of the pedestal 17. The first connecting member 21 connects the right side plate 11 and the left side plate 12 in the vehicle width direction at the third position. The fourth first connecting member 23 from the front is disposed at a fourth position where the bolt hole 18 is provided at the rear of the pedestal 17. The first connecting member 21 connects the right side plate 11 and the left side plate 12 in the vehicle width direction at the fourth position. Accordingly, the first connecting members 20 to 23 connect the right side plate 11 and the left side plate 12 in the vehicle width direction at positions where the arm brackets are fixed. A second connecting member 25 is provided inside the main body 10. The second connecting member 25 connects the right side plate 11 and the left side plate 12 in the vehicle width direction at a position where the bolt hole 65A is provided or at a position where the transaxle mount bracket is provided.

Referring back to FIG. 2, the suspension member attachment 50 has a closed section at least partially and extends in the longitudinal direction of the vehicle below the main body 10. As shown in FIGS. 2 to 4, the suspension member attachment 50 includes a right side plate 51, a left side plate 52, a rear plate 53A, and a lower plate 53B. The suspension member attachment 50 is a hollow member having a closed cross section surrounded by the right side plate 51, the left side plate 52, the rear plate 53A, the front end block 70, the lower plate 53B, and the lower plate 14 of the main body 10.

As shown in FIG. 2, a cylindrical opening 54 through which a drive shaft (not shown) of the vehicle 300 penetrates is provided at the center of the suspension member attachment 50. In front of the right side plate 51, a concave portion 55 concaved in a mortar shape is provided. The bottom of the concave portion 55 is flat. A pedestal 57 is provided at the bottom. Further, a concave portion 56 recessed in a step shape from the surface of the right side plate 51 is provided on the rear lower side of the right side plate 51. A pedestal 59 is provided at the bottom of the concave portion 56. An oval opening 61 is provided on the upper rear side of the right side plate 51. The peripheral edge of the opening 61 and the surface of the right side plate 51 are connected by an inclined curved surface. A pedestal 62 is provided at an upper portion and a lower portion of the opening 61. The pedestals 57 and 59 are portions to which arm brackets (not shown) of lower arms (not shown) of the suspension device 200 are fixed. The pedestal 62 is a portion to which an arm bracket (not shown) of an intermediate arm (not shown) of the suspension device 200 is fixed. Bolt holes 58, 60, and 63 for fixing the arm brackets are formed in the pedestals 57, 59, and 60, respectively.

As shown in FIG. 3, pedestals 66A, 64B, and 66B are provided on the surface of the rear upper end portion of the left side plate 52. The pedestal 66A is a portion to which a transaxle mount bracket (not shown) that connects an upper portion of the transaxle (not shown) and the main body 10 is fixed. The pedestals 64B and 66B are portions to which transaxle mount brackets (not shown) connecting the lower portion of the transaxle (not shown) and the main body 10 are fixed. The pedestals 66A, 64B, and 66B are provided with bolt holes 67A, 65B, and 67B for fixing the transaxle mount brackets, respectively.

As shown in FIG. 4, the second connecting members 26 and 27 are provided inside the suspension member attachment 50. The second connecting member 26 is disposed at a fifth position where the bolt hole 67A of the pedestal 66A provided on the left side plate 12 is provided. The second connecting member 26 connects the right side plate 11 and the left side plate 12 in the vehicle width direction at the fifth position. The second connecting member 27 is disposed at a sixth position where the bolt holes 65B and 67B of the pedestals 64B and 66B provided on the left side plate 12 are provided. The second connecting member 26 connects the right side plate 51 and the left side plate 52 in the vehicle width direction at the sixth position. Accordingly, the second connecting members 26 and 27 connect the right side plate 51 and the left side plate 52 in the vehicle width direction at positions where the transaxle mount brackets (not shown) are provided.

As shown in FIGS. 1 to 3, the front end block 70 is a rectangular closed cross-sectional member to which the front end of the main body 10 and the front end of the suspension member attachment 50 are connected. The right end of the front end block 70 is connected to the left end of the rear pillar 84. The suspension member attachment 50 is connected to the lower half portion 72 of the front end block 70. As shown in FIG. 3, the left side plate 52 of the suspension member attachment 50 and the front end block 70 are connected by ribs 73 and 74. Therefore, the suspension member attachment 50 is connected to the rear pillar 84 and the rocker 81 via the front end block 70. Further, a receiving seat 75 to which the front end of the connecting member 76 is connected is provided at an upper portion of the front end block 70. The receiving seat 75 protrudes obliquely upward toward the rear of the vehicle from the upper end of the front end block 70.

Figure 5:
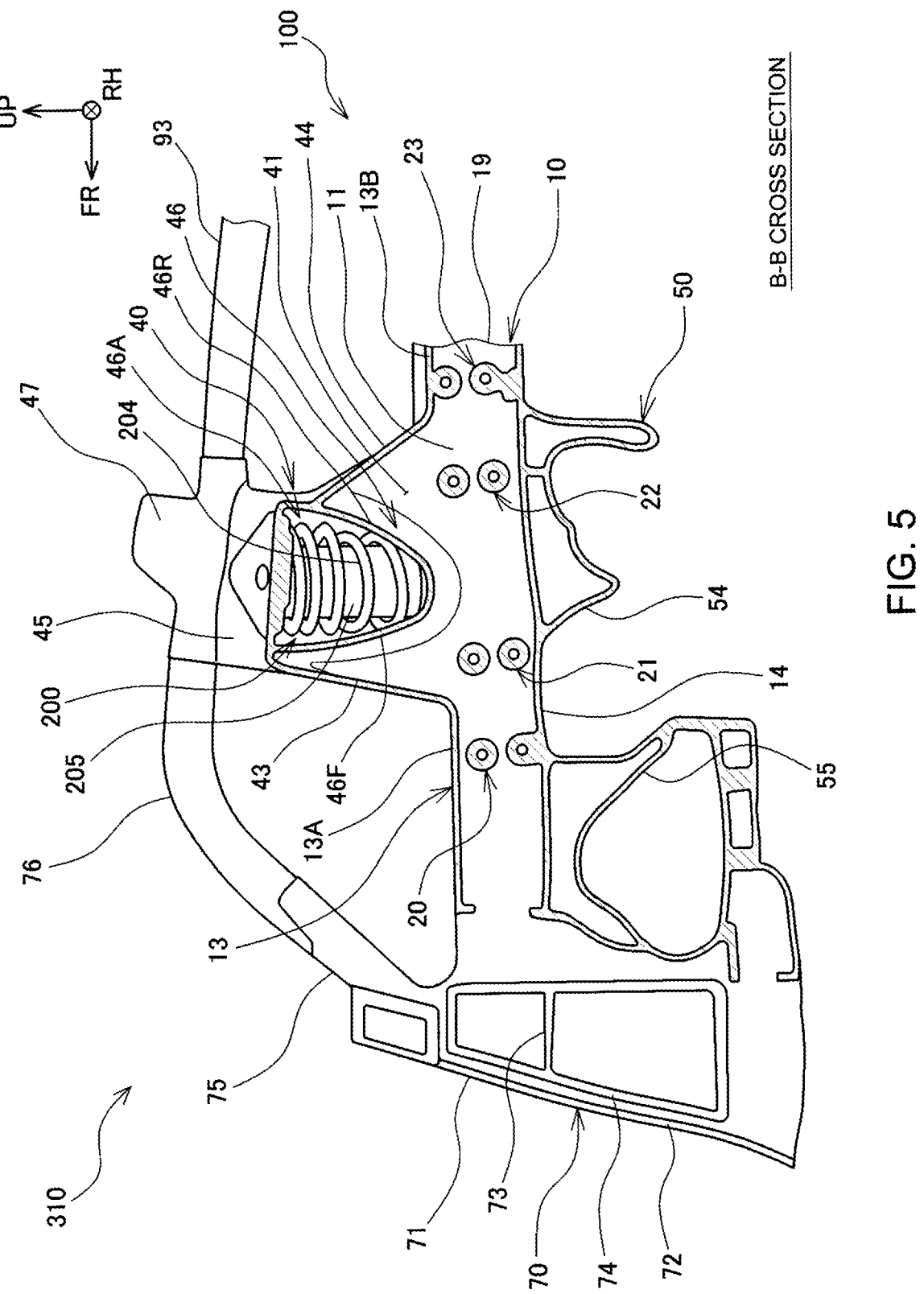
FIG. 5 is a cross-sectional view of the rear structural member taken along the line B-B shown in FIG. 2.

As shown in FIGS. 2 to 4, the tower 40 is a portion that is connected to the upper side of the main body 10 and includes a recess 46 that accommodates a part of the suspension device 200 (see FIG. 5). The tower 40 includes a right side plate 41, a left side plate 42, a front plate 43, a rear plate 44, and a ceiling plate 45. The right side plate 41, the left side plate 42, the front plate 43, and the rear plate 44 form a closed cross-sectional structure extending upward from the main body 10. An upper pedestal 47 is provided at the right end of the ceiling plate 45. As described above, the roof rail 91, the connecting member 76, and the cross connecting member 93 are connected to the upper pedestal 47. Here, the right side plate 41 and the left side plate 42 include an inner plate on the inner side in the vehicle width direction and an outer plate on the outer side in the vehicle width direction.

Figure 6:
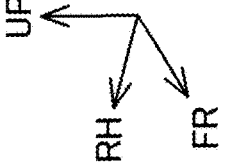
FIG. 6 is a cross-sectional perspective view of a rear structural member showing a C-C cross section shown in FIG. 2.

As shown in FIG. 4, the upper plate 13 is cut at a portion (a portion other than the general portion) of the main body 10 connected to the tower 40. The upper plate 13 is divided into a front upper plate 13A positioned in front of a position connected to the tower 40, and a rear upper plate 13B positioned in rear of a position connected to the tower 40. The lower end of the front plate 43 is connected to the front upper plate 13A so as to stand up from the front upper plate 13A of the upper plate 13. The lower end of the rear plate 44 is connected to the rear upper plate 13B so as to stand up from the rear upper plate 13B of the upper plate 13. The right side plate 41 is connected to the right side plate 11 of the main body 10. Similarly, the left side plate 42 is connected to the left side plate 12 of the main body 10. The upper end of the right side plate 41, the upper end of the left side plate 42, the upper end of the front plate 43, and the upper end of the rear plate 44 are connected by a ceiling plate 45. The lower plate 14 of the main body 10 extends in the front-rear direction from the front end block 70 to the rear end 19. Accordingly, as shown in FIGS. 4 to 6, the tower 40 and the main body 10 are composed of a front plate 43, a rear plate 44, a ceiling plate 45, a lower plate 14, right side plates 11, 41, and left side plates 12, 42. The tower 40 has a closed cross-sectional shape extending in the longitudinal direction of the vehicle. With this configuration, the strength and rigidity of the tower 40 can be increased.

As shown in FIG. 2, the right side plate 41 is provided with a recess 46. The recess 46 is a cylindrical recessed portion which is recessed toward the inner side in the vehicle width direction and whose central axis is inclined obliquely toward the outer side in the vehicle width direction. As shown in FIG. 6, the upper portion of the recess 46 is connected to the ceiling plate 45. As shown in FIG. 5, an upper portion of the coil spring 204, which is a part of the suspension device 200, and an upper portion of the shock absorber 205 are accommodated in the inner space 46A of the recess 46.

As shown in FIG. 5, the front portion 46F of the recess 46 of the right side plate 41 and the front plate 43 form a triangular columnar cross section extending upward from the right side plate 11 of the main body 10. Similarly, the rear portion 46R of the recess 46 and the rear plate 44 form a triangular columnar cross section extending upward from the right side plate 11 of the main body 10. With this configuration, the strength and rigidity of the tower 40 in the front-rear direction can be increased.

As described above, the rear structural member 100 can reduce the weight of the vehicle 300 and improve the strength and rigidity of the vehicle 300.

In the above description, the general part of the main body 10 of the rear structural member 100 has been described as a rectangular closed cross-sectional part.

The invention claimed is:

1. A vehicle rear part component connected to a rear end of a rocker and a rear pillar and extending rearwardly in a vehicle, wherein:

the vehicle rear part component is a hollow member comprising a main body, a tower, and a suspension member attachment which are integrally cast into the hollow member;

the main body at least partially has a closed cross section, and extends in a longitudinal direction of the vehicle to connect the rear pillar and a rear member in a rear part of the vehicle;

the tower is connected to a top of the main body and includes a space for accommodating a part of a suspension device;

the suspension member attachment at least partially has a closed cross section, and extends in the longitudinal direction of the vehicle on a bottom of the main body so as to be connected, at a front end of the suspension member attachment, to the rocker and the rear pillar; and the tower has a closed structure in cross section, the closed structure includes an inner plate inwardly located in a vehicle width direction, an outer plate outwardly located in the vehicle width direction, a front plate forwardly located in the vehicle, and a rear plate rearwardly located in the vehicle.

2. The vehicle rear part component according to claim 1, wherein:

the tower comprises a ceiling plate connected to the inner plate, the outer plate, the front plate, and the rear plate;

the outer plate of the tower includes a cylindrical recess which is inwardly recessed in the vehicle width direction and inclined obliquely outward in the vehicle width direction; and the space for accommodating a part of the suspension device is an inner space of the recess.

3. The vehicle rear part component according to claim 2, wherein:

the front plate of the tower and a front portion of the recess in the outer plate cooperatively form a cross sectional shape of a triangular column extending upward from the main body; and the rear plate of the tower and a rear portion of the recess in the outer plate cooperatively form a cross sectional shape of a triangular column extending upward from the main body.

4. The vehicle rear part component according to claim 2, wherein:

the main body has a closed cross section in a rectangular or elliptical shape formed of an upper plate, a lower plate, an inner side plate inwardly located in the vehicle width direction, and an outer side plate outwardly located in the vehicle width direction;

the upper plate of the main body is cut at a position where the main body is connected to the tower, and is accordingly divided into a front upper plate located forward of the position where the main body is connected to the tower, and a rear upper plate located rearward of the position where the main body is connected to the tower;

a lower end of the front plate of the tower is connected to the front upper plate of the main body;

a lower end of the rear plate of the tower is connected to the rear upper plate of the main body;

the inner plate of the tower is connected to the inner side plate of the main body, and the outer plate of the tower is connected to the outer side plate of the main body;

the tower and the main body form a closed structure in cross section, the closed structure formed by the front plate, the rear plate, the ceiling plate, the lower plate, the inner plate, the inner side plate, the outer plate, and the outer side plate.

5. The vehicle rear part component according to claim 3, wherein:

the main body has a closed cross section in a rectangular or elliptical shape formed of an upper plate, a lower plate, an inner side plate inwardly located in the vehicle width direction, and an outer side plate outwardly located in the vehicle width direction;

the upper plate of the main body is cut at a position where the main body is connected to the tower, and is accordingly divided into a front upper plate located forward of the position where the main body is connected to the tower, and a rear upper plate located rearward of the position where the main body is connected to the tower;

a lower end of the front plate of the tower is connected to the front upper plate of the main body;

a lower end of the rear plate of the tower is connected to the rear upper plate of the main body;

the inner plate of the tower is connected to the inner side plate of the main body, and the outer plate of the tower is connected to the outer side plate of the main body;

the tower and the main body form a closed structure in cross section, the closed structure formed by the front plate, the rear plate, the ceiling plate, the lower plate, the inner plate, the inner side plate, the outer plate, and the outer side plate.

* * * * *